(12) United States Patent
Tagesson et al.

(10) Patent No.: US 12,545,251 B2
(45) Date of Patent: Feb. 10, 2026

(54) TORQUE VECTORING CONTROL METHOD FOR VEHICLES

(71) Applicant: VOLVO TRUCK CORPORATION, Gothenburg (SE)

(72) Inventors: Kristoffer Tagesson, Hammarö (SE); Leo Laine, Härryda Västra Götaland (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 242 days.

(21) Appl. No.: 18/166,812

(22) Filed: Feb. 9, 2023

(65) Prior Publication Data
US 2023/0264692 A1 Aug. 24, 2023

(30) Foreign Application Priority Data
Feb. 24, 2022 (EP) .................................. 22158399

(51) Int. Cl.
*B60W 30/10* (2006.01)
*B60W 40/12* (2012.01)

(52) U.S. Cl.
CPC ............. *B60W 30/10* (2013.01); *B60W 40/12* (2013.01); *B60W 2530/00* (2013.01); *B60W 2552/00* (2020.02)

(58) Field of Classification Search
CPC .. B60W 30/10; B60W 40/12; B60W 2530/00; B60W 2552/00; B60W 30/02;
(Continued)

(56) References Cited

U.S. PATENT DOCUMENTS

2003/0055547 A1* 3/2003 Chen ..................... B60T 8/1755
701/41
2008/0086251 A1* 4/2008 Lu ......................... B60T 8/1755
701/70
(Continued)

FOREIGN PATENT DOCUMENTS

CN 110103226 A * 8/2019 ............ B25J 9/1664
EP 2604485 A2 6/2013
(Continued)

OTHER PUBLICATIONS

Huang, Hsing-Hui, and Ming-Jiang Tsai. "Vehicle Cornering Performance Evaluation and Enhancement Based on CAE and Experimental Analyses." Dec. 11, 2019, Applied Sciences, vol. 9, No. 24, pp. 5-9. (Year: 2019).*
(Continued)

Primary Examiner — Erin M Piateski
Assistant Examiner — Ashley Tiffany Schoech
(74) Attorney, Agent, or Firm — Jeffri A. Kaminski; Venable LLP (57) ABSTRACT

A computer-implemented method for reducing a lateral drift of a heavy-duty vehicle due to a road bank angle, where the heavy-duty vehicle is associated with a non-zero understeer/oversteer gradient. The method comprises obtaining a road bank angle of a road section the heavy-duty vehicle is about to traverse; obtaining a vehicle model indicative of a vehicle motion response to the road bank angle, where the vehicle model includes the understeer/oversteer gradient; determining, based on the road bank angle and the vehicle model, a first compensation torque for reducing the lateral drift of the heavy-duty vehicle at the road section; and applying the first compensation torque across different wheels of the heavy-duty vehicle to reduce the lateral drift of the heavy-duty vehicle due to the road bank angle.

15 Claims, 4 Drawing Sheets

(58) Field of Classification Search
CPC ....... B60W 30/18009; B60W 2300/12; B60W 2300/14; B60W 2552/15; B60W 2720/40; B60Y 2300/02; B62D 6/003; B62D 9/002; B62D 6/04; B62D 6/00
See application file for complete search history.

(56) References Cited

U.S. PATENT DOCUMENTS

| | | | |
|---|---|---|---|
| 2009/0287376 A1* | 11/2009 | Aso | B60W 10/20 |
| | | | 701/1 |
| 2012/0109471 A1 | 5/2012 | Wu | |
| 2012/0323420 A1 | 12/2012 | Koike et al. | |
| 2017/0233001 A1 | 8/2017 | Moshchuk et al. | |
| 2020/0341476 A1* | 10/2020 | Wuthishuwong | G08G 1/167 |
| 2022/0355792 A1* | 11/2022 | Filip | B60W 10/04 |
| 2023/0064300 A1* | 3/2023 | McGrory | B60W 30/02 |
| 2023/0249746 A1* | 8/2023 | Weston | B62D 13/00 |
| | | | 280/426 |

FOREIGN PATENT DOCUMENTS

| | | | | |
|---|---|---|---|---|
| EP | 3233600 B1 | * | 7/2020 | ............... B60K 1/00 |
| GB | 2517995 A | * | 3/2015 | ............. B60T 8/241 |
| WO | 2017095300 A1 | | 6/2017 | |

OTHER PUBLICATIONS

Vorotović, Goran S., et al. "Determination of cornering stiffness through integration of a mathematical model and real vehicle exploitation parameters." 2013, FME Transactions vol. 41, No. 1, pp. 66-71. (Year: 2013).*
Han, Kyoungseok, Mooryong Choi, and Seibum B. Choi. "Estimation of the tire cornering stiffness as a road surface classification indicator using understeering characteristics." 2018, IEEE Transactions on Vehicular Technology 67.8, pp. 6851-6860. (Year: 2018).*
Vehicle Cornering Performance Evaluation and Enhancement Based on CAE and Experimental Analyses (Year: 2019).*
Determination of cornering stiffness through integration of a mathematical model and real vehicle exploitation parameters (Year: 2013).*
Extended European Search Report in corresponding European Application No. 22158399.0 dated Aug. 29, 2022 (5 pages).

* cited by examiner

TORQUE VECTORING CONTROL METHOD FOR VEHICLES

TECHNICAL FIELD

The present disclosure relates to systems and methods for providing a lateral steering control assist to compensate for road banking in autonomously driven vehicles or vehicles where a human driver gets assistance. More specifically, embodiments of the invention relate to steering assist techniques using torque vectoring. Although the invention is described mainly with respect to heavy-duty vehicles, the invention is not restricted to this particular type of vehicle but may also be used in other types of vehicles.

BACKGROUND

Gravity makes a vehicle move sideways when it is driving on a banked road, i.e., a road angled laterally relative to a longitudinal direction of the vehicle. For example, in a velodrome this phenomenon is desired as the driver can follow the curvature without having to move the steering wheel as much compared to if there is no banking. Straight road sections are often banked as well, e.g., to clear water from the road surface. In this case, lateral movement due to road banking is not desired. In this example, the driver must counter steer to stay on track. Since most roads are banked in this way, a driver may have to counter steer for mile after mile, which is undesired. Road banking should also be accounted for in autonomous vehicles following a planned path.

US 2017/0233001 A1 discloses a method for providing vehicle lateral steering control.

However, there is a continuing need for further improvements in steering control methods accounting for road banking.

SUMMARY

It is an object of the present disclosure to provide improved vehicle control methods which can compensate for road banking. This object is at least in part achieved by a computer-implemented method for reducing a lateral drift of a heavy-duty vehicle due to a road bank angle, where the heavy-duty vehicle is associated with a non-zero understeer/oversteer gradient. The method comprises: obtaining a road bank angle of a road section the heavy-duty vehicle is about to traverse; obtaining a vehicle model indicative of a vehicle motion response to the road bank angle, where the vehicle model includes the understeer/oversteer gradient; determining, based on the road bank angle and the vehicle model, a first compensation torque for reducing the lateral drift of the heavy-duty vehicle at the road section; and applying the first compensation torque across different wheels of the heavy-duty vehicle to reduce the lateral drift of the heavy-duty vehicle due to the road bank angle.

The compensation torque is a torque vectoring type of control of the vehicle. The non-zero understeer/oversteer gradient makes it possible to use such torque vectoring to compensate for road banking without having to turn the wheels. This results in a more predictable vehicle, one which is less sensitive to disturbances coming from road banking. Furthermore, if the steering wheel is directly connected to the wheels, turning the wheels to compensate for road banking is particularly noticeable for the driver, which is undesired, especially if the motion is jerky, which is common for feedback types of steering control.

The method uses a feedforward type of control, which does not directly rely on measurements of the lateral movement of the vehicle, i.e., the disclosed control does not rely on reactive measures to compensate for a lateral drift that has already occurred. The disclosed control method is instead proactive by being based on road banking information of an upcoming road section. A benefit of such feedforward control is that the performance is less jerky compared to feedback control methods, while at the same time presenting good performance in terms of compensation for the road banking.

According to aspects, the determination of the first compensation torque is based on reducing a drift in lateral travel of the heavy-duty vehicle at an end of the road section. If an intended vehicle path is to go straight in the longitudinal direction of the vehicle, the lateral travel should be zero. Any deviation from that is considered a drift, which is undesired. However, when the intended vehicle path is to travel along a curve, a non-zero value of lateral travel is desired. In that case, however, there may be some drift from this desired value. Therefore, the first compensation torque can be determined to reduce a difference between the desired lateral travel and a lateral travel that would occur without any torque compensation.

Alternatively, or in combination of, the determination of the first compensation torque can be based on reducing a drift in lateral velocity and/or a drift in yaw rate of the heavy-duty vehicle during traversal of the road section. In some cases it can be desired or sufficient to minimize drift in lateral velocity and/or a drift in yaw rate.

According to aspects, the vehicle model models a lateral velocity at a centre of gravity and a yaw rate at the centre of gravity in response to the road bank angle. This can, e.g., be a one-track model, which is a relatively simple yet accurate way of modelling a heavy-duty vehicle.

According to aspects, the understeer/oversteer gradient is based on respective cornering stiffnesses of the axles of the heavy-duty vehicle. In that case, the cornering stiffnesses can be based on tyre properties of wheels of the heavy-duty vehicle, such as dimensions, tyre construction etc., which are relatively static parameters, or inflation pressure, load etc., which can be relatively dynamic parameters. The cornering stiffnesses can also, or alternatively, be based on vehicle roll steer geometrics, which is a phenomenon that is common for trucks which can be modelled as cornering stiffness.

According to aspects, the cornering stiffnesses are determined from vehicle motion measurements of the heavy-duty vehicle when the heavy-duty vehicle has traversed a road section. In other words, the cornering stiffnesses can at least partly be determined from recent measurements during operation of the vehicle. In the method, the first compensation torque is determined for a desired lateral motion at an upcoming road section using a vehicle model. Equations used for such determination can be used in a reversed way if actual lateral motion is measured after the vehicle has traversed a section. For example, lateral travel can be obtained using a global navigation satellite system. With the vehicle model, road banking information, and any applied compensation torque, any particular parameter in the vehicle model can be calculated from the measured lateral movement. This can be used to update parameters used in the vehicle model, such as cornering stiffnesses, to improve upcoming steering control. According to aspects, the vehicle motion measurements used for determining the cornering stiffnesses comprise any of road bank angle, lateral travel, lateral velocity, longitudinal velocity, the yaw rate, and the first compensation torque.

According to aspects, the heavy-duty vehicle comprises a towing unit and at least one towed unit connected by an articulation joint, where the vehicle model models a lateral coupling force at the articulation joint in response to the road bank angle. This lateral coupling force introduces lateral drift unless compensated for, which is undesired. However, applying the first compensation torque on the towing vehicle can compensate for unwanted movement due to the lateral coupling force.

According to aspects, the towed unit comprises driven wheels, where the method further comprises determining, based on the road bank angle and the vehicle model, a second compensation torque for reducing the coupling force at the articulation joint of the heavy-duty vehicle at the road section; and applying the second compensation torque across driven wheels of the towed unit to reduce the coupling force at the articulation joint of the heavy-duty vehicle due to the road bank angle. If the lateral coupling force due to road banking is zeroed or at least reduced, steering control for the towing vehicle could be simplified, in particular the determination of the first compensation torque which would have to account for less disturbances due to road banking.

According to aspects, the road bank angle is obtained from map data and/or one or more vehicle sensors. Vehicle sensors can provide a current bank angle which can be used as an approximation of the bank angle in the upcoming road section or provide bank angle information of upcoming road sections. The first compensation torque may be applied to the vehicle for any value of the road bank angle, or it may only be applied if the road bank angle is above a predetermined threshold value. This can reduce any jerking in the motion of the vehicle.

There is also disclosed herein a computer program comprising program code means for performing the steps of the method discussed above when said program is run on a computer or on processing circuitry of a control unit.

There is also disclosed herein a computer program product comprising a computer program according to the discussion above, and a computer readable means on which the computer program is stored.

There is also disclosed herein a control unit for reducing a lateral drift of a heavy-duty vehicle due to a road bank angle, where the heavy-duty vehicle is associated with a non-zero understeer/oversteer gradient. The control unit comprises: processing circuitry; a network interface coupled to the processing circuitry; and a memory coupled to the processing circuitry. The memory comprises machine readable computer program instructions that, when executed by the processing circuitry, causes the control unit to: obtain a road bank angle of a road section the heavy-duty vehicle is about to traverse; obtain a vehicle model indicative of a vehicle motion response to the road bank angle, where the vehicle model includes the understeer/oversteer gradient; determine, based on the road bank angle and the vehicle model, a first compensation torque for reducing the lateral drift of the heavy-duty vehicle at the road section; and apply the first compensation torque across different wheels of the heavy-duty vehicle to reduce the lateral drift of the heavy-duty vehicle due to the road bank angle.

There is also disclosed herein a heavy-duty vehicle comprising the control unit discussed above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure is thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
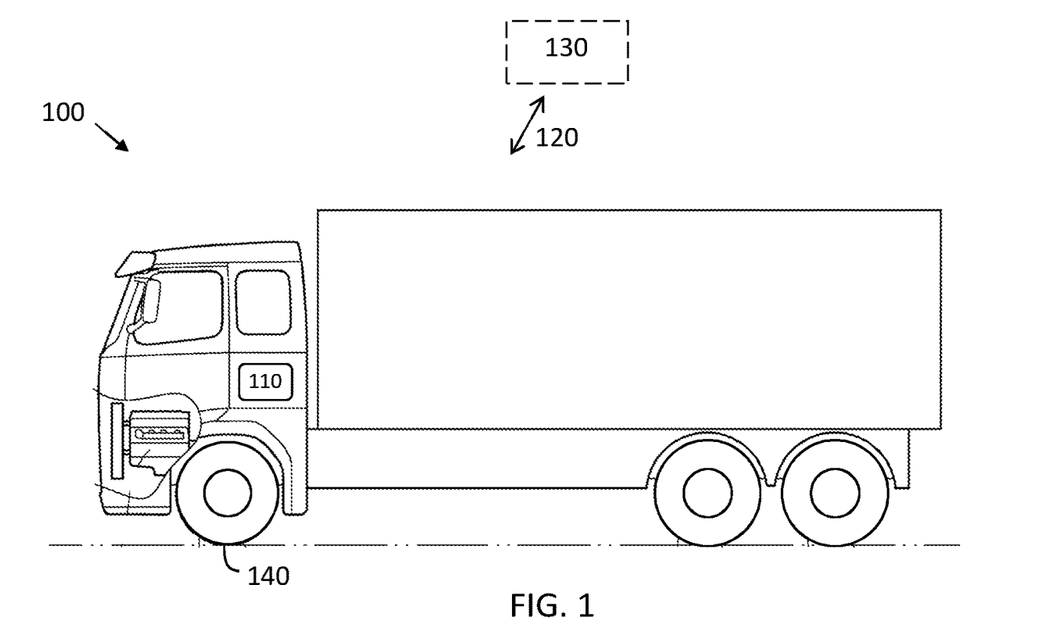
FIG. 1 schematically illustrates a heavy-duty vehicle.

FIG. 1 schematically illustrates an example heavy-duty vehicle 100 for cargo transport. The heavy-duty vehicle comprises a local control unit 110 for, i.a., controlling motion of the vehicle. The control unit 110 may implement various types of support systems and systems for vehicle functional safety, such as advanced driver assistance systems (ADAS) and functions for autonomous drive systems (ADS). The vehicle may be connected 120 to a processing device 130 arranged to perform calculations to assist the vehicle control system comprising the control unit 110. The connection 120 is preferably wireless but may also be a wireline connection or a connection via a storage module such as a hard drive or the like. Herein, a heavy-duty vehicle 100 is taken to be a vehicle designed for the handling and transport of heavier objects or large quantities of cargo. As an example, a heavy-duty vehicle could be truck as in FIG. 1, or a vehicle combination comprising a truck or towing vehicle configured to tow a trailer unit in a known manner, e.g., by a fifth wheel connection. A heavy-duty vehicle could be a vehicle designed for use in construction, mining operations, and the like. Although the invention is described mainly with respect to heavy-duty vehicles, the invention is not restricted to this particular type of vehicle but may also be used in other types of vehicles.

Figure 2:
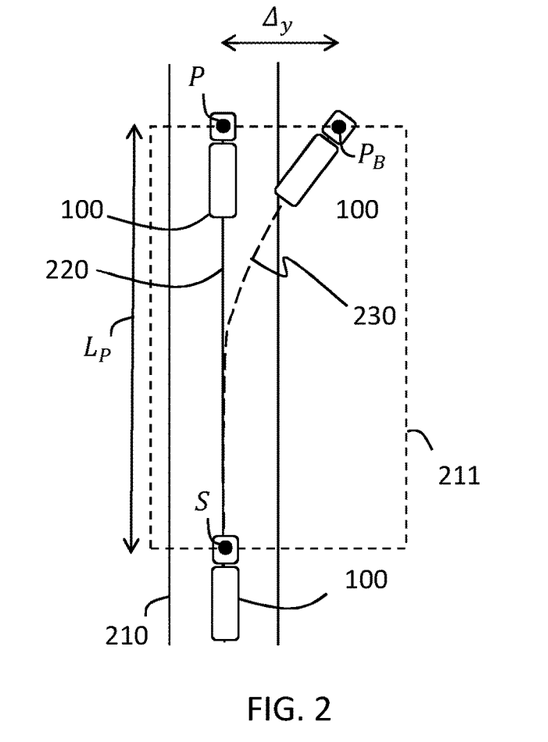
FIG. 2 illustrates a heavy-duty vehicle traversing a road.
Figure 3:
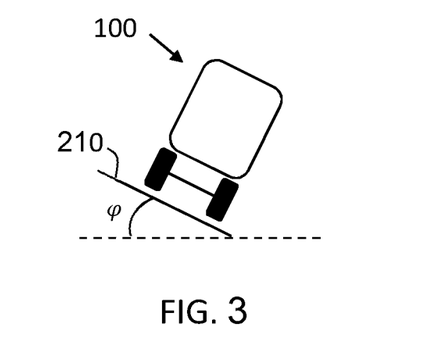
FIG. 3 shows a heavy-duty vehicle on a banking road.

FIGS. 2 and 3 show a heavy-duty vehicle 100 traversing a banked road 210, where FIG. 2 is a top view and FIG. 3 shows the vehicle from the back, i.e., in a longitudinal direction. The road has a bank angle φ relative to a horizontal direction, which is in turn is perpendicular relative to the gravity direction. FIG. 2 shows a start position S of the vehicle. The vehicle is about to traverse a road section 211. Assuming a steady state motion, the vehicle will end up at position $P_B$ after a time $t_P$ due to the road banking if no compensation steering is applied. The vehicle would in that case follow a path 230. In this case, a desired path is to go straight along path 220 to end up at position P after time $t_P$. The position $P_B$ has lateral travel Δy relative to a longitudinal direction of the starting position of the vehicle. The position P is at a longitudinal distance $L_P$ away from the start position S. This distance can be obtained from $L_P = v_x t_P$, where $v_x$ is the longitudinal velocity of the vehicle. These positions can, e.g., represent positions of the centre of gravity of the vehicle. In the example of FIG. 2, there is a lateral drift of a heavy-duty vehicle. Herein, drift means a deviation from a desired value. In the example, the vehicle has lateral travel Δy at the end of the road section if no compensation for road banking is applied. Furthermore, it is desired that the lateral travel Δy is zero in the example, which means that the drift in lateral travel is equal to Δy in this case. In general in the present disclosure, however, the lateral travel Δy must not always be equal to zero. There can be a desired lateral travel $Δy_D$, e.g., in a curve. In that case, the drift in lateral travel would be the difference between $Δy_D$ and a travelled lateral distance that would occur if no compensation were. Furthermore, the lateral drift can mean a drift in other parameters related to lateral motion, such as yaw rate and lateral velocity, which are discussed in more detail below.

One way to compensate for the road banking is to counter steer with the wheels. The steering wheel is often mechanically linked to the wheels, which results in the steering wheel also moving when counter steering is used to compensate for the disturbance due to road banking. Another limitation with such approach is that the sensors that are involved in measuring the lateral movement (disturbance) can cause a jerky sensation in the steering wheel experienced by the driver. There is consequently a need not to have the function engaged all the time, but only if the disturbance is detected as large enough. This, on the other hand, can result in a large drift to occur before it is accounted for.

The present disclosure relates to using torque vectoring to compensate for lateral drift due to road banking. The general idea of torque vectoring is to apply different torques to different wheels to provide an effective torque vector in a vertical direction. Torque vectoring can use a differential which can vary the torque to each shaft. If the heavy-duty vehicle is modeled with a one-track model, also commonly called bicycle model, which is discussed in more detail below, applying different torques to the two shafts results in an effective torque vector at the effective bicycle wheel of that axle, which points in a vertical direction. Such vertical torque can be used to control steering of the heavy-duty vehicle. Differential torque can be applied on one or several axles arranged at the front and/or rear of the heavy-duty vehicle. In that case, a torque vector can also be generated across different axles. Furthermore, torque vectoring can also be implemented using independent motors for each wheel, which is common for electrical vehicles.

Torque vectoring can be achieved with positive or negative torques on the wheels. Using brakes for negative torque is not preferred, however, since they cannot be applied continuously for long time periods. An electric drive with individual control of both wheels of an axle, on the other hand, can continuously provide torque vectoring.

To summarize, the present disclosure is directed towards applying a compensation torque across different wheels of the heavy-duty vehicle 100 to reduce a lateral drift of the heavy-duty vehicle due to road banking. This compensation torque can be applied using, e.g., the torque vectoring techniques discussed above.

Although the disclosed method is particularly relevant for heavy-duty vehicles with a direct mechanical connection between the wheels and the steering wheel, the method is also suitable for vehicles without such direct connection, e.g., vehicles using a drive by wire solution.

The present disclosure uses a feedforward type of control, which does not directly rely on measurements of the lateral movement of the heavy-duty vehicle, i.e., the disclosed control does not rely on reactive measures to compensate for a lateral drift that has already occurred. The disclosed control method is instead proactive by being based on road banking information of an upcoming road section. The road bank angle φ can, e.g., be obtained from map data and/or one or more vehicle sensors. A benefit of such feedforward control is that the performance is less jerky compared to feedback control methods, while at the same time presenting good performance in terms of compensating for the road banking.

Figure 4A:
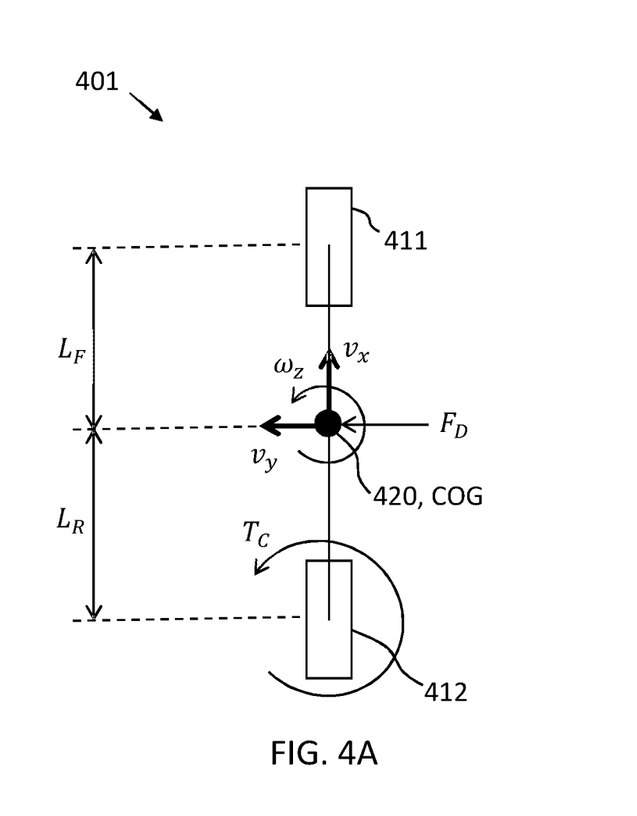
FIGS. 4A and 4B show vehicle models.

FIG. 4A shows a vehicle model 401 of the heavy-duty vehicle which can be used in the disclosed method. This model is a one-track bicycle model comprising a front wheel 411 and a rear wheel 412. The towing vehicle has a mass m and the centre of gravity (COG) 420 between the wheels 411 and 412. At the COG, the vehicle has a lateral velocity $v_y$, a longitudinal velocity $v_x$, and a vertical yaw rate $ω_z$. The wheelbase between the front and the rear wheel is L, which is a sum a distance $L_F$ between the front wheel and the COG and a distance $L_R$ between the rear wheel and the COG, i.e., $L = L_F + L_R$. The front wheel and the rear wheel in the bicycle model are associated with respective lateral linear cornering stiffnesses $C_F$ and $C_R$.

In general, cornering stiffness $C_α$ describes how a lateral force $F_{y,slip}$ depends on a lateral slip angle $α_{slip}$, which is the angle between the direction of heading and direction of travel of the vehicle. When the slip angle is low, such as below 8 degrees, the lateral force can be expressed as $$F_{y,slip} = C_α α_{slip}$$

The cornering stiffness can be based on tyre properties of wheels 140 of the heavy-duty vehicle 100, such as dimensions, tyre construction (e.g., bias ply or radial ply), tyre treads, cord angles, number of plies etc. These parameters are relatively static. With those parameters given, inflation pressure and load (i.e., vertical force, determined from, i.a., vehicle mass and geometry) are other tyre properties that have a strong influence on the cornering stiffness.

Axle roll steer is a phenomenon that is common for trucks. This phenomenon can be modelled as a change in cornering stiffness when using a one-track model. Thus, it is possible account for roll steer by adjusting the value of $C_F$ and $C_R$.

The cornering stiffnesses of the front wheel and the rear wheel of the bicycle model can be used to calculate an understeer/oversteer gradient $K_u$, which generally is a measure of how much the steering should be adjusted as the speed increases when driving in a circle with fixed radius. The understeer/oversteer gradient $K_u$ can be based on respective cornering stiffnesses of the axles of the heavy-duty vehicle 100 according to, e.g., $$K_u = \frac{C_R L_R - C_F L_F}{C_R C_F L}$$

This vehicle model further assumes that the heavy-duty vehicle 100 has linear tire properties, and that the heavy-duty vehicle has reached steady state, i.e., the time derivatives of the lateral velocity $v_y$, the longitudinal velocity $v_x$, and the yaw rate $\omega_z$ are zero. It is further assumed that the slip ratio $v_y/v_x$ is small. These assumptions are often valid except for in transients. The assumptions are typically valid a couple of hundred milliseconds after that any of the conditions has changed.

A lateral disturbance force $F_D$ due to road banking can be expressed as $$F_D = mg \sin \varphi$$

where g is the constant of gravity and $\varphi$ is the bank angle of the road section 211.

In an example scenario, the disclosed method applies a first compensation torque $T_C$ on the modelled bicycle rear wheel 412. As discussed above, however, torque vectoring for road banking compensation can be achieved in many different ways.

Using the vehicle model comprising the bicycle model of FIG. 4A and the above-mentioned assumptions, equilibrium of lateral forces and of torques can be expressed as $$\frac{C_F}{v_x}(v_y + L_F\omega_z) + \frac{C_R}{v_x}(v_y + L_R\omega_z) = F_D$$

$$T_C - \frac{C_F}{v_x}(v_y + L_F\omega_z)L_F + \frac{C_R}{v_x}(v_y + L_R\omega_z)L_R = 0$$

Solving for $v_y$ and $\omega_z$ gives $$\frac{v_y}{v_x} = \frac{L_R^2 C_R + L_F^2 C_F}{C_F C_R L^2} F_D + \frac{K_u}{L} T_C \quad (1)$$

$$\frac{\omega_z}{v_x} = \frac{K_u}{L} F_D + \frac{C_R + C_F}{C_F C_R L^2} T_C \quad (2)$$

From these two equations, i.e., Equations (1) and (2), it can be seen that the lateral disturbance $F_D$ due to road banking has an effect on both the yaw rate $\omega_z$ and on the lateral velocity $v_y$. Noticeably, the road banking would not affect the yaw rate if the heavy-duty vehicle were so called neutrally steered, i.e., $K_u=0$. Neutrally steered configurations or at least configurations having a small understeer/oversteer gradient is relatively common for passenger cars but not for heavy-duty vehicles. The two equations further show that the first compensation torque $T_C$ also impacts both the yaw rate $\omega_z$ and the lateral velocity $v_y$. However, $T_C$ has an opposite relation to $K_u$ compared to $F_D$. If $K_u=0$, $T_C$ would not affect $v_y$. These two equations thus show that it is explicitly possible to compensate for lateral drift due to road banking by applying a compensation torque if the heavy-duty vehicle is associated with a non-zero understeer/oversteer gradient $K_u$.

The understeer/oversteer gradient is a property of the vehicle and is therefore implicitly or explicitly reflected in the vehicle model used in the disclosed method. In other words, the vehicle model includes understeer/oversteer gradient $K_u$. The parameters in Equations (1) and (2), such as $K_u$, $L_R$, $L_F$, $C_R$, $C_F$, can be explicitly used to calculate lateral motion of the heavy-duty vehicle 100. The parameters can also be implicitly reflected in the vehicle model by, e.g., measuring how the first compensation torque $T_C$ affects the ratio $v_y/v_x$. In that case, the factor relating $T_C$ to $v_y/v_x$ can be determined as a whole. In Equation (1), this factor is the ratio $K_u/L$. Thereby, the non-zero understeer/oversteer gradient is implicitly reflected in the vehicle model. By using such implicit reflection, model inaccuracies could be accounted for. Similarly, some factor relating the disturbance force $F_D$ to the ratio $\omega_z/v_x$ can be determined to implicitly reflect the understeer/oversteer gradient $K_u$ in the vehicle model.

Figure 5:
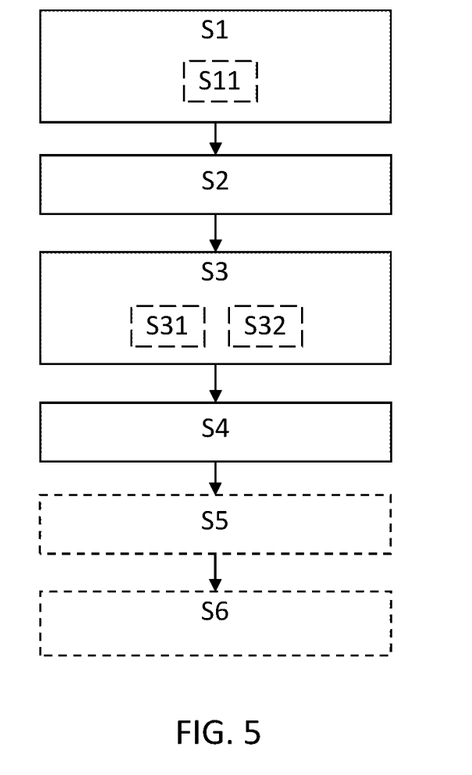
FIG. 5 is a flow chart illustrating a method.

The disclosed method is summarized in FIG. 5, which shows a computer-implemented method for reducing a lateral drift of a heavy-duty vehicle 100 due to a road bank angle $\varphi$, where the heavy-duty vehicle is associated with a non-zero understeer/oversteer gradient $K_u$. The method comprises: obtaining S1 a road bank angle $\varphi$ of a road section 211 the heavy-duty vehicle 100 is about to traverse; obtaining S2 a vehicle model indicative of a vehicle motion response to the road bank angle $\varphi$, where the vehicle model includes the understeer/oversteer gradient $K_u$; determining S3, based on the road bank angle $\varphi$ and the vehicle model, a first compensation torque $T_C$ for reducing the lateral drift of the heavy-duty vehicle 100 at the road section 211; and applying S4 the first compensation torque $T_C$ across different wheels 140 of the heavy-duty vehicle 100 to reduce the lateral drift of the heavy-duty vehicle due to the road bank angle $\varphi$.

As mentioned, the road bank angle $\varphi$ can, e.g., be obtained S11 from map data and/or one or more vehicle sensors. For example, if the upcoming road section 211 extends 10 meters in the longitudinal direction, the road bank angle $\varphi$ can be obtained as an average value of banking in that section from a map. Alternatively, or in combination of, a vehicle sensor can provide a current bank angle which can be used as an approximation of the bank angle in the upcoming road section. Examples of such sensors are gyros, accelerometers, slope sensors, and pressure sensors in the suspension system. Other vehicle sensors, such as a camera, lidar, radar, etc., can also provide bank angle information of upcoming road sections. The first compensation torque $T_C$ may be applied to the vehicle for any value of the road bank angle $\varphi$ or it may only be applied if the road bank angle $\varphi$ is above a predetermined threshold value.

The longitudinal length of the road section 211 can be determined in a number of different ways. It can, e.g., be the longitudinal velocity $v_x$ of the heavy-duty vehicle multiplied with a time factor under which the model assumptions are expected to result in accurate motion prediction, which could be a couple hundred milliseconds or so. Alternatively, the longitudinal length of the road section 211 could be some fixed value that results in smooth steering control in most scenarios. A corresponding time can in that case be calculated from the longitudinal velocity $v_x$ of the heavy-duty vehicle. The length can also be different predetermined values depending on the location. For example, a straight path can be divided into parts with relatively large lengths of the longitudinal section, and curves can be divided into parts with relatively small lengths. Such information can be comprised in the mentioned map data.

The vehicle model can be the one-track bicycle model discussed in connection to FIG. 4A. However, other bicycle models or more general models may be used in the disclosed method to achieve a reduction of lateral drift due to road banking.

Both the yaw rate $\omega_z$ and the lateral velocity $v_y$ influence the lateral drift of the heavy-duty vehicle 100 when the understeer/oversteer gradient $K_u$ is non-zero. The first compensation torque $T_C$ is determined for reducing the lateral drift of the heavy-duty vehicle at the road section 211. The reduction of lateral drift can be a reduction of drift in parameters related to lateral motion. For example, the determination of the first compensation torque $T_C$ can be based on reducing S31 a drift in lateral travel $\Delta y$ of the heavy-duty vehicle 100 at an end of the road section 211. The end of the road section is where the heavy-duty vehicle has travelled after a configurable time $t_P$.

Various drifts in lateral travel $\Delta y$ were discussed above in connection to FIG. 2. Using the vehicle model, the lateral travel $\Delta y$ after the time $t_P$ can be calculated from $$\Delta y = v_y t_P + \frac{\omega_z t_p^2 v_x}{2}$$

If it is assumed that the road bank angle $\varphi$ is constant across the road section 211 it is possible to determine the first compensation torque $T_C$ such that a lateral travel $\Delta y$ of the vehicle is zero at a preview point P. In other words, setting $\Delta y=0$ gives the compensation torque as $$T_C = \frac{2L_R^2 C_R + 2L_F^2 C_F + (C_R L_R - C_R L_F) L_P}{2C_R L_R - 2C_F L_F + (C_R + C_F) L_P} F_D$$

This way, the first compensation torque $T_C$ is selected such that the lateral travel ($\Delta y$) becomes zero at some preview position P after time $t_P$, which is located a distance $L_P$ longitudinally ahead of the vehicle. This is an example how the determination of the first compensation torque $T_C$ comprises an explicit calculation.

As mentioned, this lateral travel $\Delta y$ must not necessarily be zero. In some cases, moving a lateral distance is desired. For example, when following a corner some non-zero value of $\Delta y$ is desired. However, there may be some drift from this desired value and correction would in that case be desired. In that case, the first compensation torque $T_C$ can be selected in a similar way as above but with the difference that $\Delta y$ is set the desired value instead of zero, where this desired value is based on information about upcoming road curvature.

Alternatively, the first compensation torque $T_C$ can be selected by neglecting the influence of either the lateral velocity $v_y$ and/or the yaw rate $\omega_z$, and thereafter determine the first compensation torque $T_C$ by zeroing (or suppress) only the other part, i.e., to set either $v_y$ or $\omega_z$ in Equations (1) or (2) to zero and solve for $T_C$. This is applicable if the understeer/oversteer gradient $K_u$ is non-zero. More generally, however, $T_C$ can in this case be solved for a reduced drift from a desired value. In other words, the determination of the first compensation torque $T_C$ can be based on reducing S32 a drift in lateral velocity $v_y$ and/or a drift in yaw rate $\omega_z$ of the heavy-duty vehicle 100 during traversal of the road section 211. One benefit of these two ways of determining the first compensation torque is that they do not directly require tuning parameters like $L_P$. In this case, the length of the road section or duration where the drift in lateral velocity and/or drift in yaw rate is reduced can be predetermined. However, the length or duration are not used directly to calculate the torque. Moreover, these ways of determining the torque can be beneficial if it assumed that the driver is less annoyed by a yaw disturbance than lateral velocity disturbance or vice versa. Also, this setup can be suitable if there are other systems in the vehicle reducing one of yaw rate or lateral velocity, such as yaw compensation by active steering compensation.

As mentioned, the understeer/oversteer gradient $K_u$ can be based on respective cornering stiffnesses of the axles of the heavy-duty vehicle 100, and the cornering stiffnesses can be based on tyre parameters, roll steer geometrics, or other vehicle parameters. The cornering stiffnesses can be directly calculated/determined from such parameters during various test data of the vehicle. For example, cornering stiffnesses can be measured for a vehicle for a number of different states, such as different loads on the tyres, inflation pressures, and other parameters affecting roll steer. When the vehicle is about to traverse the road section 211, a current vehicle state can be mapped to a list of states which comprises corresponding cornering stiffnesses. Such mapping can also use interpolation or other curve fitting techniques.

In the disclosed method, the first compensation torque $T_C$ is determined for a desired lateral motion at an upcoming road section using a vehicle model. Equations used for such determination can be used in a reversed way if actual lateral motion is measured after the vehicle has traversed a section. For example, lateral travel can be obtained using a global navigation satellite system. With the vehicle model, road banking information, and any applied compensation torque, any particular parameter in the vehicle model can be calculated from the measured lateral movement. This can be used to update parameters used in the vehicle model, such as cornering stiffnesses, to improve upcoming steering control.

In other words, various parameters in the vehicle model may be calculated from a measured lateral movement/drift after it has occurred and after a known compensation torque has been applied. This known compensation torque could even be set to zero. This way it is possible to determine some vehicle motion parameters based on measurements of other parameters from the vehicle model. Such updated parameters could then be used for upcoming sections of the road. In general, parameters for the vehicle model can either be constant (based on test data or physical vehicle parameters) or adapted while driving.

For example, the cornering stiffnesses can be determined from vehicle motion measurements of the heavy-duty vehicle 100 when the heavy-duty vehicle has traversed a road section 211. In other words, the cornering stiffnesses can at least partly be determined from recent measurements during operation. After the heavy-duty vehicle 100 has traversed a road section, the cornering stiffnesses can be calculated from measured vehicle motion parameters such as any of the road bank angle $\varphi$, lateral travel $\Delta y$, the lateral velocity $v_y$, the longitudinal velocity $v_x$, the yaw rate $\omega_z$, and the first compensation torque $T_C$. If such parameters are known, the vehicle model can be used to instead determine the cornering stiffnesses. For example, the understeer/oversteer gradient Ky could be determined from Equations (1) and (2), which, in turn, can be used to estimate the cornering stiffnesses. The cornering stiffnesses can also be determined from other known relations between cornering stiffness and vehicle motion.

The cornering stiffnesses determined from a road section the vehicle just has traversed can then be used for determination of the compensation torque in an upcoming road section 211 the vehicle is about to traverse. Cornering stiffnesses may also be based on averaging measurements across multiple traversed road sections.

Similarly, the road bank angle could be determined based on measurements of other vehicle motion parameters if the cornering stiffnesses are known.

Figure 4B:
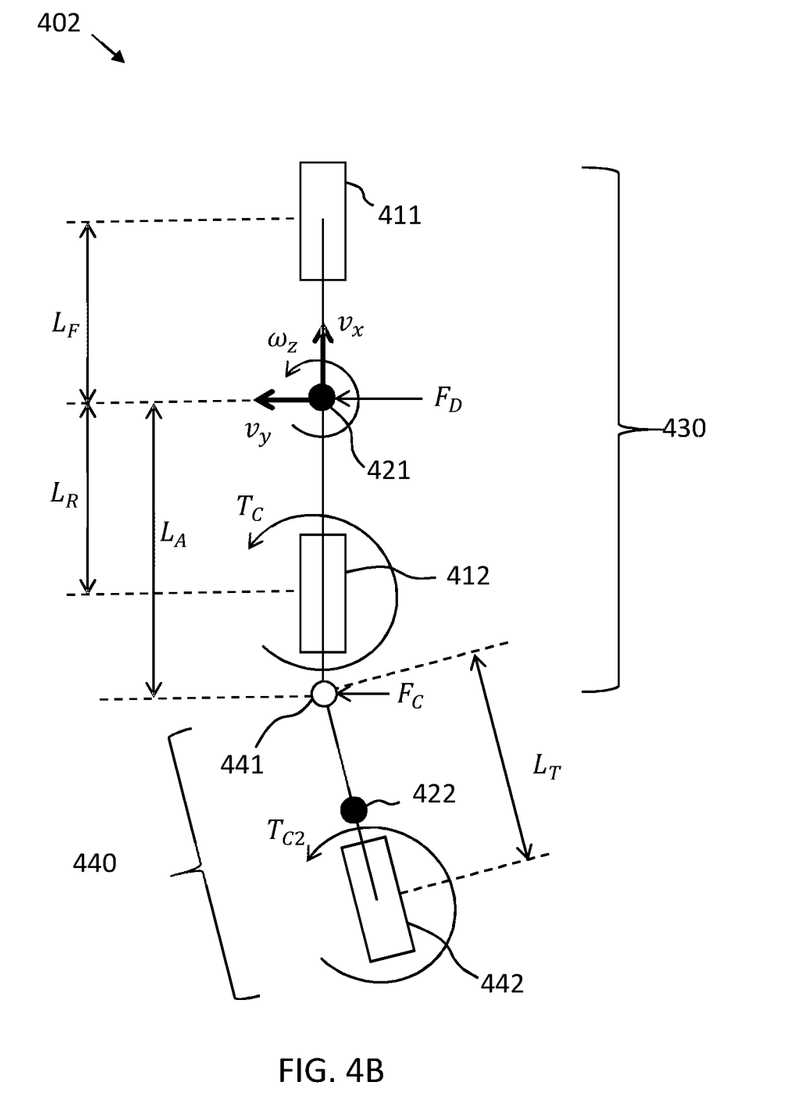

The heavy-duty vehicle 100 may comprise a towing unit 430 and at least on towed unit 440, such as a semitrailer, connected by an articulation joint 441, where the vehicle model models a lateral coupling force $F_C$ at the articulation joint in response to the road bank angle $\varphi$. The articulation joint may, e.g., be a fifth wheel connection.

FIG. 4B shows an example vehicle model 402 with a towing unit 430 and a towed unit 440, which is similar to the bicycle model in FIG. 4A. The towed unit comprises an effective wheel 442 and has a centre of gravity 422. The articulation joint 441 is arranged at a distance $L_A$ from the COG 421 of the towing unit. The length of distance from the articulation joint 441 to the wheel 442 is $L_T$. With this towed unit 440, there is yet another lateral force term $F_C$ caused by road banking acting on the towing unit. The term will not act at the COG, but at the articulation joint. This lateral coupling force $F_C$ results in modified equations for equilibrium of lateral forces and of torques. Using the discussed model assumptions, superposition is possible since it is a linear system. With these modified equations, the first compensation torque $T_C$ can be determined to reduce lateral drift in similar ways as discussed in connection to FIG. 4A, such as minimizing drift in lateral travel $\Delta y$, lateral velocity $v_y$, and/or yaw rate $\omega_z$.

The heavy-duty vehicle 100 may comprise a plurality of towed units. In that case, similar models as in FIG. 4B can be used, which would result in other modified equations for equilibrium of lateral forces and of torques, which in turn can be used to determine the first compensation torque $T_C$ to reduce lateral drift.

Furthermore, the towed unit 440 may be equipped with driven wheels that enables torque vectoring, e.g. wheel end motors. In that case, it is possible to derive a second compensation torque $T_{C2}$ for the driven axles of the towed unit which reduces or zeroes the lateral coupling force $F_C$ due to road banking. In other words, the disclosed method may comprise determining S5, based on the road bank angle $\varphi$ and the vehicle model, a second compensation torque $T_{C2}$ for reducing the coupling force $F_C$ at the articulation joint of the heavy-duty vehicle 100 at the road section 211; and applying S6 the second compensation torque across driven wheels of the towed unit to reduce the coupling force $F_C$ at the articulation joint of the heavy-duty vehicle 100 due to the road bank angle $\varphi$.

Similar compensation torques can be calculated for each articulation joint of each towed unit with driven wheels.

Figure 6:
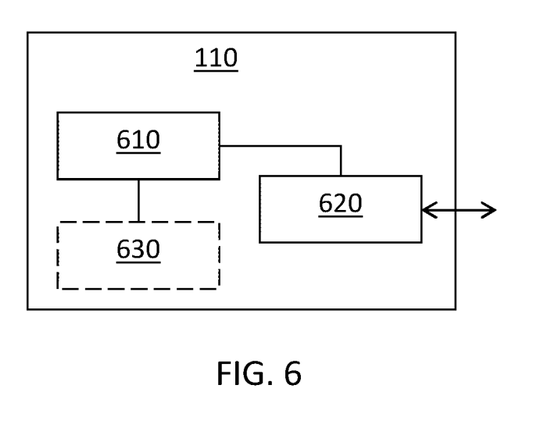
FIG. 6 schematically illustrates a control unit.

FIG. 6 schematically illustrates, in terms of a number of functional units, the components of a control unit 110 according to embodiments of the discussions and methods disclosed herein. Processing circuitry 610 is provided using any combination of one or more of a suitable central processing unit CPU, multiprocessor, microcontroller, digital signal processor DSP, etc., capable of executing software instructions stored in a computer program product, e.g., in the form of a storage medium 630. The processing circuitry 610 may further be provided as at least one application specific integrated circuit ASIC, or field programmable gate array FPGA.

Particularly, the processing circuitry 610 is configured to cause the control unit 110 to perform a set of operations, or steps, such as the methods discussed in connection to FIG. 5. For example, the storage medium 630 may store the set of operations, and the processing circuitry 610 may be configured to retrieve the set of operations from the storage medium 630 to cause the control unit 110 to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The control unit 110 may further comprise an interface 620 for communications with at least one external device, such as the processing device 130. As such the interface 620 may comprise one or more transmitters and receivers, comprising analogue and digital components and a suitable number of ports for wireline or wireless communication.

The processing circuitry 610 controls the general operation of the control unit 110, e.g., by sending data and control signals to the interface 620 and the storage medium 630, by receiving data and reports from the interface 620, and by retrieving data and instructions from the storage medium 630. Other components, as well as the related functionality, of the control node are omitted in order not to obscure the concepts presented herein.

Figure 7:
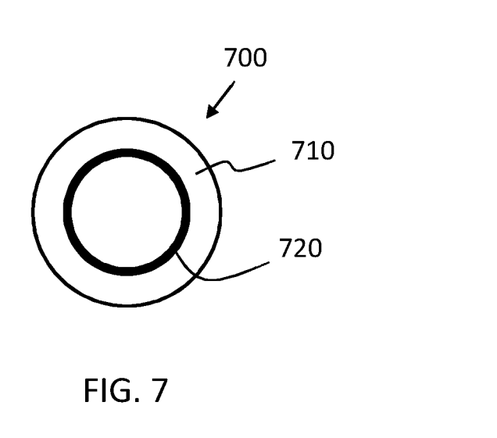
FIG. 7 shows an example computer program product.

FIG. 7 illustrates a computer readable medium 710 carrying a computer program 720 comprising program code means for performing, e.g., the methods illustrated in FIG. 5, when said program product is run on a computer. The computer readable medium and the code means may together form a computer program product 700.

The invention claimed is:

1. A computer-implemented method for reducing a lateral drift of a heavy-duty vehicle due to a road bank angle, wherein the heavy-duty vehicle is associated with a non-zero understeer/oversteer gradient, the method comprising:
    obtaining a road bank angle of a road section the heavy-duty vehicle is about to traverse;
    obtaining a vehicle model indicative of a vehicle motion response to the road bank angle, where the vehicle model includes the understeer/oversteer gradient;
    determining, based on the road bank angle and the vehicle model, a first compensation torque for reducing the lateral drift of the heavy-duty vehicle at the road section;
    applying the first compensation torque across different wheels of the heavy-duty vehicle to reduce the lateral drift of the heavy-duty vehicle due to the road bank angle,
    wherein the heavy-duty vehicle comprises a towing unit and at least one towed unit connected by an articulation joint, where the vehicle model models a lateral coupling force at the articulation joint in response to the road bank angle.

2. The method according to claim 1, wherein the determination of the first compensation torque is based on reducing a drift in lateral travel of the heavy-duty vehicle at an end of the road section.

3. The method according to claim 1, wherein the determination of the first compensation torque is based on reducing a drift in lateral velocity and/or a drift in yaw rate of the heavy-duty vehicle during traversal of the road section.

4. The method according to claim 1, wherein the vehicle model models a lateral velocity at a centre of gravity and a yaw rate at the centre of gravity in response to the road bank angle.

5. The method according to claim 1, wherein the understeer/oversteer gradient is based on respective cornering stiffnesses of axles of the heavy-duty vehicle.

6. The method according to claim 5, wherein the cornering stiffnesses are based on tyre properties of wheels of the heavy-duty vehicle.

7. The method according to claim 5, wherein the cornering stiffnesses are based on vehicle roll steer geometrics.

8. The method according to claim 5, wherein the cornering stiffnesses are determined from vehicle motion measurements of the heavy-duty vehicle when the heavy-duty vehicle has traversed a road section.

9. The method according to claim 8, wherein the vehicle motion measurements comprise any of road bank angle, lateral travel, lateral velocity, longitudinal velocity, yaw rate, and the first compensation torque.

10. The method according to claim 1, wherein the towed unit comprises driven wheels, where the method further comprises determining, based on the road bank angle and the vehicle model, a second compensation torque for reducing the coupling force at the articulation joint of the heavy-duty vehicle at the road section; and applying the second compensation torque across driven wheels of the towed unit to reduce the coupling force at the articulation joint of the heavy-duty vehicle due to the road bank angle.

11. The method according to claim 1, wherein the first compensation torque is applied if the road bank angle is above a predetermined threshold value.

12. The method according to claim 1, wherein the road bank angle is obtained from map data and/or one or more vehicle sensors.

13. A non-transitory computer readable medium storing program code for performing the steps of claim 1 when said program code is run on a computer or on processing circuitry of a control unit.

14. A control unit for reducing a lateral drift of a heavy-duty vehicle due to a road bank angle, wherein the heavy-duty vehicle is associated with a non-zero understeer/oversteer gradient, the control unit comprising: processing circuitry; a network interface coupled to the processing circuitry; and a memory coupled to the processing circuitry, wherein the memory comprises machine readable computer program instructions that, when executed by the processing circuitry, causes the control unit to:

obtain a road bank angle of a road section the heavy-duty vehicle is about to traverse;

obtain a vehicle model indicative of a vehicle motion response to the road bank angle where the vehicle model includes the understeer/oversteer gradient;

determine, based on the road bank angle and the vehicle model, a first compensation torque for reducing the lateral drift of the heavy-duty vehicle at the road section;

apply the first compensation torque across different wheels of the heavy-duty vehicle to reduce the lateral drift of the heavy-duty vehicle due to the road bank angle, wherein the heavy-duty vehicle comprises a towing unit and at least one towed unit connected by an articulation joint, where the vehicle model models a lateral coupling force at the articulation joint in response to the road bank angle.

15. A heavy-duty vehicle comprising the control unit according to claim 14.

* * * * *